United States Patent
Zhamu et al.

(10) Patent No.: US 7,875,219 B2
(45) Date of Patent: Jan. 25, 2011

(54) PROCESS FOR PRODUCING NANO-SCALED GRAPHENE PLATELET NANOCOMPOSITE ELECTRODES FOR SUPERCAPACITORS

(75) Inventors: Aruna Zhamu, Centerville, OH (US); Bor Z. Jang, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 599 days.

(21) Appl. No.: 11/906,786

(22) Filed: Oct. 4, 2007

(65) Prior Publication Data

US 2009/0092747 A1    Apr. 9, 2009

(51) Int. Cl.
    *H01G 9/00* (2006.01)
(52) U.S. Cl. .......................... 264/29.1; 264/28; 264/109
(58) Field of Classification Search .................. None
    See application file for complete search history.

(56) References Cited

U.S. PATENT DOCUMENTS

| | | | |
|---|---|---|---|
| 5,993,996 A * | 11/1999 | Firsich | 429/231.8 |
| 6,031,711 A | 2/2000 | Tennent et al. | |
| 6,099,960 A | 8/2000 | Tennent et al. | |
| 6,205,016 B1 | 3/2001 | Niu | |
| 6,757,154 B2 | 6/2004 | Reynolds, III et al. | |
| 6,830,595 B2 | 12/2004 | Reynolds, III | |
| 7,071,258 B1 | 7/2006 | Jang et al. | |
| 7,206,189 B2 | 4/2007 | Reynolds, III et al. | |
| 7,623,340 B1 * | 11/2009 | Song et al. | 361/502 |
| 2007/0158618 A1 * | 7/2007 | Song et al. | 252/500 |

OTHER PUBLICATIONS

U.S. Appl. No. 10/858,814, filed Jun. 3, 2004, B. Z. Jang, et al.
U.S. Appl. No. 11/787,442, filed Apr. 17, 2007, A. Zhamu, et al.
U.S. Appl. No. 11/800,728, filed May 8, 2007, A. Zhamu, et al.
U.S. Appl. No. 11/879,680, filed Jul. 19, 2007, A. Zhamu, et al.
U.S. Appl. No. 11/881,388, filed Jul. 27, 2007, A. Zhamu, et al.
U.S. Appl. No. 11/881,389, filed Jul. 27, 2007, A. Zhamu, et al.

(Continued)

*Primary Examiner*—Mary Lynn F Theisen

(57) ABSTRACT

A process for producing meso-porous nanocomposite electrode comprising nano-scaled graphene platelets. The process comprises: (A) providing nano-scaled graphene platelets, wherein each of the platelets comprises a single graphene sheet or a stack of multiple graphene sheets, and the platelets have an average thickness no greater than 100 nm (preferably less than 5 nm and most preferably less than 2 nm in thickness); (B) combining a binder material, the graphene platelets, and a liquid to form a dispersion; (C) forming the dispersion into a desired shape and removing the liquid to produce a binder-platelet mixture; and (D) treating the binder material under a desired temperature or radiation environment to convert the binder-platelet mixture into a meso-porous nanocomposite electrode, wherein the platelets are bonded by the binder and the electrode has electrolyte-accessible pores characterized in that the nanocomposite has a surface area greater than about 100 m²/gm (preferably greater than 200 m²/gm, more preferably greater than 500 100 m²/gm, and most preferably greater than 1,000 m²/gm). A supercapacitor featuring such a nanocomposite exhibits an exceptionally high capacitance value.

40 Claims, 8 Drawing Sheets

OTHER PUBLICATIONS

U.S. Appl. No. 11/881,390, filed Jul. 27, 2007, A. Zhamu, et al.
U.S. Appl. No. 11/499,861, filed Aug. 7, 2006, L. Song, et al.
K. H. An, et al., "Electrochemical Properties of High-Power Supercapacitors Using Single-Walled CNT Electrodes," Advanced Functional Materials, 11 (No. 5) (Oct. 2001) 387-392.
G. Z. Chen, "Carbon Nanotube and Polypyrrole Composites: Coating and Doping," Advanced Materials, 12 (No. 7) (2000) 522-526.
C. Zhou, et al., "Functionalized Single Wall CNTs Treated with Pyrrole for Electrochemical Supercapacitor Membranes," Chemistry of Materials, 17 (2005) 1997-2002.
K. Jurewicz, et al., "Supercapacitors from Nanotubes/Polypyrrole Composites," Chemical Physics Letters, 347 (Oct. 2001) 36-40.
J. E. Huang, et al., "Well-dispersed Single-walled CNT/Polyaniline Composite Films," Carbon, 41 (2003) 2731-2736.

* cited by examiner (A)

(B)

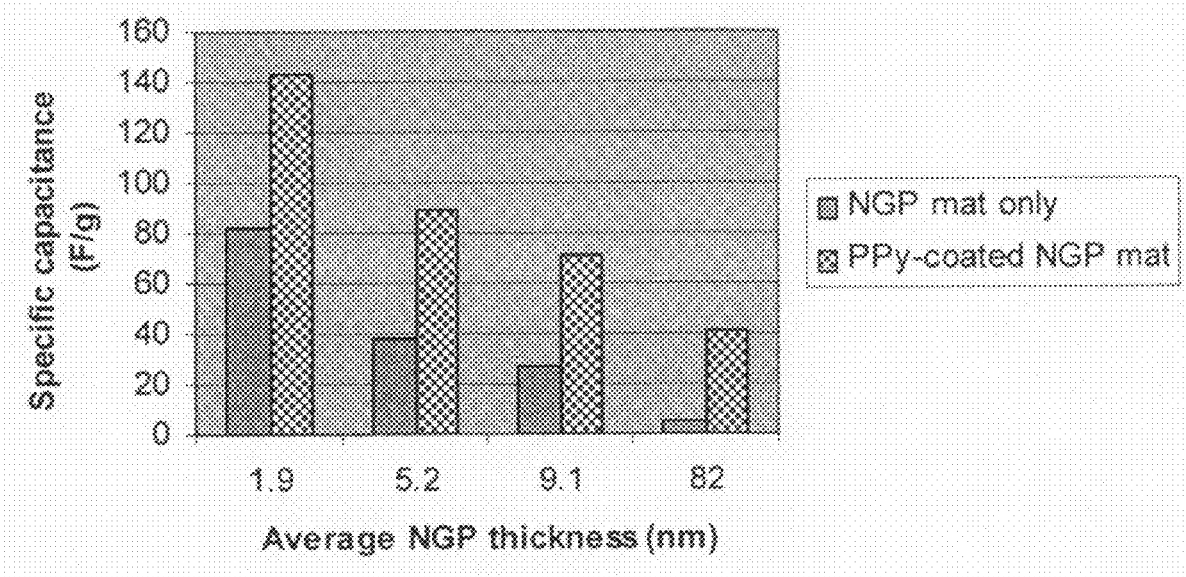

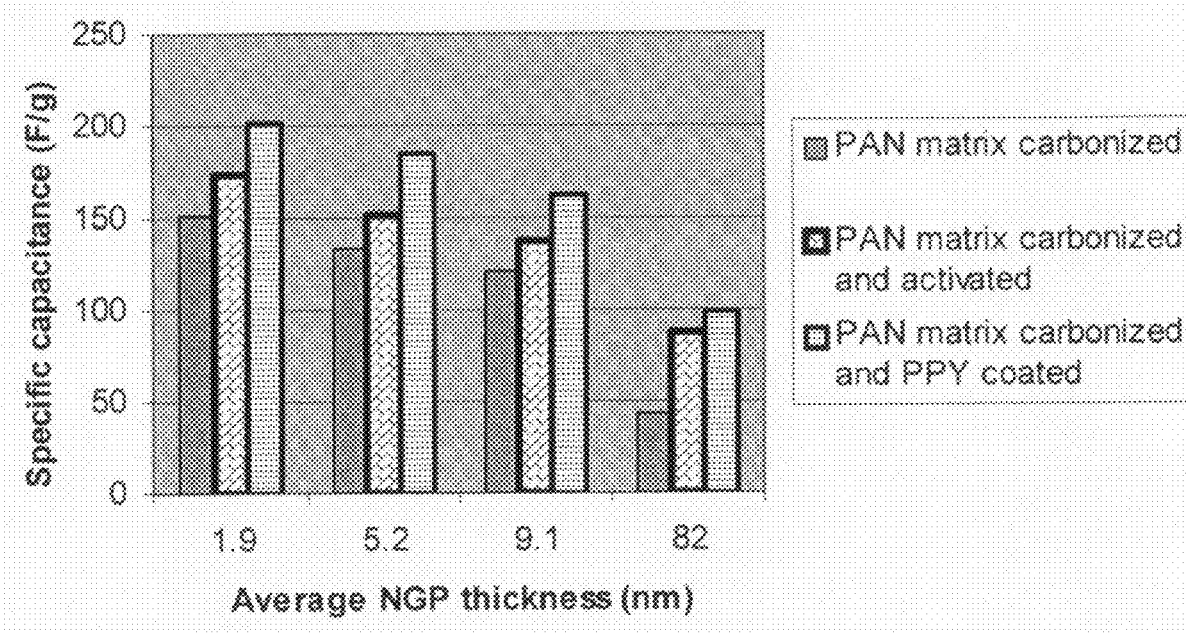

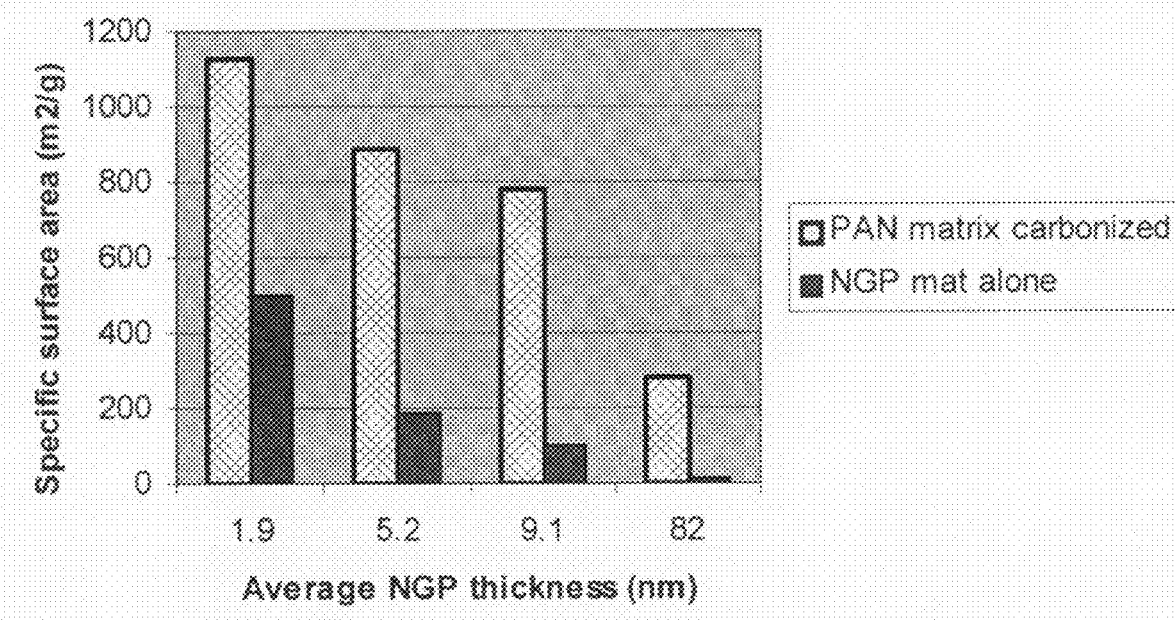
FIG. 8 Specific surface area of NGP mat and NGP/PAN-based carbon matrix nanocomposites.

PROCESS FOR PRODUCING NANO-SCALED GRAPHENE PLATELET NANOCOMPOSITE ELECTRODES FOR SUPERCAPACITORS

This invention is based on the results of a research project sponsored by the US DOE SBIR Program. The US government has certain rights on this invention.

This application is related to a co-pending application: Lulu Song, A. Zhamu, Jiusheng Guo, and B. Z. Jang "Nano-scaled Graphene Plate Nanocomposites for Supercapacitor Electrodes" U.S. patent Pending, Ser. No. 11/499,861 (Aug. 7, 2006).

FIELD OF THE INVENTION

The present invention relates generally to the field of supercapacitor or ultracapacitor electrode materials based on nanocomposites, and more particularly to processes for producing supercapacitor electrodes featuring nano-graphene plate-based composite materials (NGP nanocomposites).

BACKGROUND OF THE INVENTION

Electrochemical capacitors (ECs), also known as ultracapacitors or supercapacitors, are being considered for uses in hybrid electric vehicles (EVs) where they can supplement a battery used in an electric car to provide bursts of power needed for rapid acceleration, the biggest technical hurdle to making battery-powered cars commercially viable. A battery would still be used for cruising, but capacitors (with their ability to release energy much more quickly than batteries) would kick in whenever the car needs to accelerate for merging, passing, emergency maneuvers, and hill climbing. The EC must also store sufficient energy to provide an acceptable driving range. To be cost- and weight-effective compared to additional battery capacity they must combine adequate specific energy and specific power with long cycle life, and meet cost targets as well. Specifically, it must store about 400 Wh of energy, be able to deliver about 40 kW of power for about 10 seconds, and provide high cycle-life (>100,000 cycles).

ECs are also gaining acceptance in the electronics industry as system designers become familiar with their attributes and benefits. ECs were originally developed to provide large bursts of driving energy for orbital lasers. In complementary metal oxide semiconductor (CMOS) memory backup applications, for instance, a one-Farad EC having a volume of only one-half cubic inch can replace nickel-cadmium or lithium batteries and provide backup power for months. For a given applied voltage, the stored energy in an EC associated with a given charge is half that storable in a corresponding battery system for passage of the same charge. Nevertheless, ECs are extremely attractive power sources. Compared with batteries, they require no maintenance, offer much higher cycle-life, require a very simple charging circuit, experience no "memory effect," and are generally much safer. Physical rather than chemical energy storage is the key reason for their safe operation and extraordinarily high cycle-life. Perhaps most importantly, capacitors offer higher power density than batteries.

The high volumetric capacitance density of an EC (10 to 100 times greater than conventional capacitors) derives from using porous electrodes to create a large effective "plate area" and from storing energy in the diffuse double layer. This double layer, created naturally at a solid-electrolyte interface when voltage is imposed, has a thickness of only about 1-2 nm, thus forming an extremely small effective "plate separation." In some ECs, stored energy is further augmented by pseudo-capacitance effects, occurring again at the solid-electrolyte interface due to electrochemical phenomena such as the redox charge transfer. The double layer capacitor is based on a high surface area electrode material, such as activated carbon, immersed in an electrolyte. A polarized double layer is formed at electrode-electrolyte interfaces providing high capacitance.

Experience with ECs based on activated carbon electrodes shows that the experimentally measured capacitance is always much lower than the geometrical capacitance calculated from the measured surface area and the width of the dipole layer. For very high surface area carbons, typically only about ten percent of the "theoretical" capacitance was observed. This disappointing performance is related to the presence of micro-pores and ascribed to inaccessibility of some pores by the electrolyte, wetting deficiencies, and/or the inability of a double layer to form successfully in pores in which the oppositely charged surfaces are less than about 2 nm apart. In activated carbons, depending on the source of the carbon and the heat treatment temperature, a surprising amount of surface can be in the form of such micro-pores.

It would be desirable to produce an EC that exhibits greater geometrical capacitance using a carbon based electrode having a high accessible surface area, high porosity, and reduced or no micro-pores. It would be further advantageous to develop carbon-based nano-structures that are conducive to the occurrence of pseudo-capacitance effects such as the redox charge transfer.

In this context, carbon nanotubes (CNTs) are of great interest. CNTs are nanometer-scale sized tube-shaped molecules having the structure of a graphite molecule rolled into a rube. A nanotube can be single-walled or multi-walled, dependent upon conditions of preparation. Carbon nanotubes typically are electrically conductive and mechanically strong and stiff along their length. Nanotubes typically also have a relatively high aspect ratio (length/diameter ratio). Due to these properties, the use of CNTs as reinforcements in composite materials for both structural and functional applications would be advantageous. In particular, CNTs are being studied for electrochemical supercapacitor electrodes due to their unique properties and structure, which include high surface area, high conductivity, and chemical stability. Capacitance values from 20 to 180 F/g have been reported, depending on CNT purity and electrolyte, as well as on specimen treatment such as $CO_2$ physical activation, KOH chemical activation, or exposure to nitric acid, fluorine, or ammonia plasma. Carbon nano-fibers (CNFs) and graphitic nano-fibers (GNFs), two thicker-diameter cousins of CNTs, have also been investigated as potential EC electrode materials.

Conducting polymers, such as polyacetylene, polypyrrole, polyaniline, polythiophene, and their derivatives, are also common electrode materials for supercapacitors. The modification of CNTs with conducting polymers is one way to increase the capacitance of the composite resulting from redox contribution of the conducting polymers. In the CNT/conducting polymer composite, CNTs are electron acceptors while the conducting polymer serves as an electron donor. A charge transfer complex is formed between CNTs in their ground state and aniline monomer. A number of studies on CNT/conducting polymer composites for electrochemical capacitor applications have been reported. The following references [Refs. 1-8] are related to CNT-, CNF-, or GNF-based EC electrodes:

1. K. H. An, et al., "Electrochemical Properties of High-Power Supercapacitors Using Single-Walled CNT Electrodes," Advanced Functional Materials, 11 (No. 5) (October 2001) 387-392.

2. G. Z. Chen, "Carbon Nanotube and Polypyrrole Composites: Coating and Doping," Advanced Materials, 12 (No. 7) (2000) 522-526.
3. C. Zhou, et al., "Functionalized Single Wall CNTs Treated with Pyrrole for Electrochemical Supercapacitor Membranes," Chemistry of Materials, 17 (2005) 1997-2002.
4. K. Jurewicz, et al., "Supercapacitors from Nanotubes/Polypyrrole Composites," Chemical Physics Letters, 347 (October 2001) 36-40.
5. J. E. Huang, et al., "Well-dispersed Single-walled CNT/Polyaniline Composite Films," Carbon, 41 (2003) 2731-2736.
6. H. Tennent, et al., "Graphitic Nano-fibers in Electrochemical Capacitors," U.S. Pat. No. 6,031,711 (Feb. 29, 2000).
7. H. Tennent, et al., "High Surface Area Nanofibers, Methods of Making, Methods of Using and Products Containing Same," U.S. Pat. No. 6,099,960 (Aug. 8, 2000).
8. C. M. Niu, "Fibril Composite Electrode for Electrochemical Capacitors," U.S. Pat. No. 6,205,016 (Mar. 20, 2001).
9. R. A. Reynolds, III, "Method of Making Composite Electrode and Current Collectors," U.S. Pat. No. 6,830,595 (Dec. 14, 2004).
10. R. A. Reynolds, III, et al., "Double-Layer Capacitor Component and Method for Preparing Them," U.S. Pat. No. 6,757,154 (Jun. 29, 2004).
11. R. A. Reynolds, III, "Composite Electrode and Current Collectors and Processes for Making the Same," U.S. Pat. No. 7,206,189 (Apr. 17, 2007).

However, there are several drawbacks associated with carbon nano-tubes or nano-fibers for EC electrode applications. First, both nano-tubes and nano-fibers are extremely expensive. Second, both materials tend to form a tangled mess resembling a hairball, which is difficult to work with. These and other difficulties have limited efforts toward commercialization of supercapacitors containing nano-tube or nano-fiber based electrodes.

As a less expensive material, flexible graphite sheet has been used in an integrated electrode/current collector for EC applications, wherein the flexible graphite sheet is used as a substrate to support thereon an electrode active material (e.g., activated carbon particles) [Refs. 9-11]. Actually, these carbon particles are embedded on the surface or into the bulk of a flexible graphite sheet. The "flexible graphite" is typically obtained by first treating natural graphite particles with an intercalating agent (intercalant) that penetrates into the inter-planar spacings of the graphite crystals to form a graphite intercalated compound (GIC). The GIC is then exposed to a thermal shock, up to a temperature of typically 800-1,100° C., to expand the intercalated particles by typically 80-300 times in the direction perpendicular to the graphene layers (basal planes) of a graphite crystal structure. The resulting expanded or exfoliated graphite particles are vermiform in appearance and are, therefore, commonly referred to as graphite worms. Hereinafter, the term "exfoliated graphite" will be used interchangeably with the term "expanded graphite." The worms may be re-compressed together into flexible sheets which can be formed and cut into various shapes. These thin sheets (foils or films) are commonly referred to as flexible graphite. Flexible graphite can be wound up on a drum to form a roll of thin film, just like a roll of thin plastic film or paper. The flexibility or compressibility of flexible graphite or exfoliated graphite enables the hard solid carbon particles to be embedded into the flexible graphite sheet when solid carbon particles and exfoliated graphite are combined and calendared, roll-pressed, or embossed together. However, such a combined electrode/current collector as disclosed in [Refs. 9-11] has several major shortcomings:

1. The exfoliated graphite or flexible graphite sheet cited in these patents is a passive material that is used solely as a substrate or binder material to hold the electrode active material together for forming an integral member (electrode/current collector). The flexible graphite or exfoliated graphite itself is not used as an electrode active material, i.e., it does not provide the diffuse double layer charges and, hence, does not contribute to the double layer capacitance.

2. In order for a flexible graphite sheet or exfoliated graphite particles to hold activated carbon particles together, the total amount of exfoliated graphite must be at least 50% by volume or more. Individual graphite particles are a solid, not a liquid adhesive. Although exfoliated graphite particles themselves can be re-compressed together to form a cohered body, the resulting flexible graphite sheet is normally very fragile. When a large amount of exfoliated graphite is used, the relative proportion of the electrode active material (the material that actually contributes to double layer capacitance) is small. Consequently, the effective energy density of the resulting supercapacitor is significantly curtailed.

3. By embedding activated carbon particles into a flexible graphite sheet or mixing activated carbon particles with exfoliated graphite particles, one tends to seal off the pores of activated carbon particles that have surface openings supposedly functioning to accommodate the liquid electrolyte. Mixing or embedding significantly reduces the amount of carbon particle pores that are designed to be accessible by liquid electrolyte, thereby reducing the effective electrolyte-electrode interface areas where double layer charges can be formed.

4. The activated carbon particles utilized by Reynolds, et al. [Refs. 9-11] were typically in the range of 600 μm and 900 μm. They were too big to penetrate the inter-layer spaces (<2.8 nm within an inter-planar spacing of 0.335 nm) between two graphene planes of unexpanded graphite crystallites. They were also too big to penetrate the space (typically <10 μm) between graphite flakes (each flake comprising a multiplicity of graphene sheets bonded by van der Waal's forces). With a maximum average expansion ratio of 300, the original inter-planar spacing of 0.335 nm would become at most 100 nm on average. In rare cases, there could be some pores as large as 10 μm, but these pores are still too small to accept activated solid carbon particles. In actuality, the activated carbon particles are simply squeezed by and held in place between clusters of expanded graphite flakes. Of course, such a configuration is advantageous in that it provides a substrate with good electrical conductivity and this substrate functions as a current collector as well.

Instead of trying to develop much lower-cost processes for making CNTs, researchers (Jang, et al.) at Nanotek Instruments, Inc. have worked diligently to develop alternative nano-scaled carbon materials that exhibit comparable properties, but are more readily available and at much lower costs. This development work has led to the discovery of processes for producing individual nano-scaled graphite planes (individual graphene sheets) and stacks of multiple nano-scaled graphene sheets, which are collectively called nano-sized graphene plates (NGPs). NGPs could provide unique opportunities for solid state scientists to study the structures and properties of nano carbon materials. The structures of these materials may be best visualized by making a longitudinal scission on the single-wall or multi-wall of a nano-tube along its tube axis direction and then flattening up the resulting sheet or plate. FIG. 1 shows an atomic force microscopic picture of a sample of NGPs. In practice, NGPs are obtained from a precursor material, such as minute graphite particles, using a low-cost process, but not via flattening of CNTs. One of the cost-effective processes is exfoliation of graphite to produce graphite worms of loosely connected flakes, followed by separation of these flakes into isolated (unconnected) graphene platelets. These nano materials could potentially become cost-effective substitutes for CNTs or other types of nano-rods for various scientific and engineering applications. These diligent efforts have led to the following patent applications [Refs. 12-20]:

12. B. Z. Jang and W. C. Huang, "Nano-scaled Graphene Plates," U.S. Pat. No. 7,071,258 (Jul. 4, 2006).
13. B. Z. Jang, L. X. Yang, S. C. Wong, and Y. J. Bai, "Process for Producing Nano-scaled Graphene Plates," U.S. patent pending, Ser. No. 10/858,814 (Jun. 3, 2004).
14. Aruna Zhamu, JinJun Shi, Jiusheng Guo, and Bor Z. Jang, "Low-Temperature Method of Producing Nano-scaled Graphene Platelets and Their Nanocomposites," U.S. patent Pending, Ser. No. 11/787,442 (Apr. 17, 2007).
15. Aruna Zhamu, Jinjun Shi, Jiusheng Guo and Bor Z. Jang, "Method of Producing Exfoliated Graphite, Flexible Graphite, and Nano-Scaled Graphene Plates," U.S. patent Pending, Ser. No. 11/800,728 (May 8, 2007).
16. Aruna Zhamu, Joan Jang, Jinjun Shi, and Bor Z. Jang, "Method of Producing Ultra-thin Nano-Scaled Graphene Platelets," U.S. patent Pending, Ser. No. 11/879,680 (Jul. 9, 2007).
17. Aruna Zhamu, Joan Jang, and Bor Z. Jang, "Electrochemical Method of Producing Ultra-thin Nano-Scaled Graphene Platelets," U.S. patent Pending, Ser. No. 11/881,388 (Jul. 27, 2007).
18. Aruna Zham and Bor Z. Jang, "Environmentally Benign Chemical Method of Producing Exfoliated Graphite, Flexible Graphite, and Nano-Scaled Graphene Platelets," U.S. patent Pending, Ser. No. 11/881,389 (Jul. 27, 2007).
19. Aruna Zham and Bor Z. Jang, "Environmentally Benign Graphite Intercalation Compound Composition for Exfoliated Graphite, Flexible Graphite, and Nano-Scaled Graphene Platelets," U.S. patent Pending, Ser. No. 11/881,390 (Jul. 27, 2007).
20. Lulu Song, A. Zhamu, Jiusheng Guo, and B. Z. Jang "Nano-scaled Graphene Plate Nanocomposites for Supercapacitor Electrodes" U.S. patent Pending, Ser. No. 11/499,861 (Aug. 7, 2006).

For instance, Jang, et al. [Ref. 13] disclosed a process to readily produce NGPs in large quantities. The process includes the following procedures: (1) providing a graphite powder containing fine graphite particles preferably with at least one dimension smaller than 200 µm (most preferably smaller than 1 µm); (2) exfoliating the graphite crystallites in these particles in such a manner that at least two graphene planes are fully separated from each other, and (3) mechanical attrition (e.g., ball milling) of the exfoliated particles to become nano-scaled, resulting in the formation of NGPs with platelet thickness smaller than 100 nm. The starting powder type and size, exfoliation conditions (e.g., intercalation chemical type and concentration, temperature cycles, and the mechanical attrition conditions (e.g., ball milling time and intensity)) can be varied to generate, by design, various NGP materials with a wide range of graphene plate thickness, width and length values. We have successfully prepared NGPs with an average length in the range of 1 to 20 µm). However, the length or width can be smaller than 500 nm and, in several cases, smaller than 100 nm. Ball milling is known to be an effective process for mass-producing ultra-fine powder particles. The processing ease and the wide property ranges that can be achieved with NGP materials make them promising candidates for many important engineering applications. The electronic, thermal and mechanical properties of NGP materials are expected to be comparable to those of carbon nano-tubes; but NGPs will be available at much lower costs and in larger quantities.

After an extensive and in-depth study of the electrochemical response of NGPs and their composites, we have found that a certain class of meso-porous composites containing NGPs as electrode ingredients exhibit superior charge double layer-type supercapacitance and redox charge transfer-type pseudo-capacitance. Preferred compositions were described in an earlier application [20]. These electrode materials can be mass-produced cost-effectively and, hence, have much greater utility value compared to carbon nanotube-based materials.

Thus, it is an object of the present invention to provide a process for producing porous nanocomposites that contain fully separated nano graphite platelets (NGPs) with a sufficient amount and packing arrangement effective for achieving a high surface area greater than 100 $m^2/gm$. The specific area of the resulting nanocomposite electrode is typically greater than 200 $m^2/gm$ and, in many cases, greater than 500 $m^2/gm$ and even greater than 1000 $m^2/gm$ when the nanocomposite matrix is made via pyrolization of a polymer.

It is another object of the present invention to provide a process for producing a supercapacitor electrode featuring porous nanocomposites that contain fully separated graphite platelets with a sufficient level of porosity effective for achieving a high capacitance value.

It is yet another object of the present invention to provide a process for continuously producing a porous nanocomposite electrode comprising fully separated graphite platelets that are smaller than 10 µm in length, width or diameter and smaller than 100 nm in thickness (typically and preferably smaller than 10 nm).

It is still another object of the present invention to provide a process for producing porous nanocomposites comprising fully separated graphite platelets that are surface-functionalized or activated.

It is still another object of the present invention to provide a process for producing a porous nanocomposite electrode comprising fully separated graphite platelets that are smaller than 100 nm (preferably smaller than 10 nm) in thickness. These nano-scaled graphene plates are attached to or bonded by a conductive material such as a conjugate chain polymer for a significantly improved charge storage capacity. The matrix material may comprise a conducting polymer, polymeric carbon, coal tar pitch, petroleum pitch, glassy or amorphous carbon, or a combination thereof

SUMMARY OF THE INVENTION

A preferred embodiment of the present invention is a process for producing meso-porous nanocomposite electrode comprising nano-scaled graphene platelets. The process comprises: (A) providing nano-scaled graphene platelets (NGPs), wherein each of the platelets comprises a single graphene sheet or a stack of multiple graphene sheets, and the platelets have an average thickness no greater than 100 nm (preferably no greater than 10 nm, further preferably smaller than 5 nm, and most preferably smaller than 2 nm); (B) combining a binder material, the platelets, and a liquid to form a dispersion; (C) forming the dispersion into a desired shape and removing the liquid to produce a binder-platelet mixture; and (D) treating the binder material under a desired temperature or radiation environment to convert the binder-platelet mixture into a meso-porous nanocomposite electrode, wherein the platelets are bonded by the binder material and the electrode has electrolyte-accessible pores characterized in that the nanocomposite has a surface area greater than about 100 $m^2$/gm (preferably greater than 200 $m^2$/gm, further preferably greater than 500 $m^2$/gm, and most preferably greater than 1,000 $m^2$/gm).

The binder material is preferably a polymer and the liquid is a solvent for the polymer. Step (B) then comprises dissolving at least a part of the polymer in the solvent to form a solution and Step (C) comprises vaporizing the solvent so that the polymer will bond the platelets together to form an integral electrode body with pores with desired sizes. In one version of the invented process, Step (B) and Step (C) comprise freeze-drying the liquid to produce pores. In other words, the polymer-solvent solution (in which NGPs are dispersed) may be rapidly frozen. Subsequently, the solvent is forced to sublime (go directly from a frozen solid state to a vapor state), leaving behind meso-scaled pores.

In another preferred embodiment, the binder material is initially in a fine powder or filament (fiber) form and Step (D) comprises melting the powder or filament to form a flowable melt, allowing the binder melt to attach to the platelets, and solidifying the binder to produce the nanocomposite electrode containing platelets bonded by a solid binder material. For instance, suspensions of polytetrafluoroethylene (PTFE) in solvent are readily available commercially. NGPs may be mixed with such a suspension to form a dispersion. Upon removal (vaporization) of the solvent, fine PTFE powder particles will reside between graphene platelets. By heating to melt out the PTFE powder (at a temperature higher than 320° C.), the polymer melt will flow around to bind to graphene platelets. By cooling the material down to room temperature one obtains an integral electrode with platelets well-bonded by PTFE. The starting binder material may also be in a fiber form, which may be melted later to flow around platelets.

In another preferred embodiment, the binder comprises a thermosetting resin or a polymerizable monomer and Step (D) comprises curing the resin or polymerizing the monomer to form a solid resin or polymer with the assistance of heat, radiation, an initiator, a catalyst, or a combination thereof. The thermosetting resin may be initially a liquid dissolved in a solvent or a solid powder suspended in a liquid. Once the solvent or liquid is removed, curing is activated to form a cross-linked network of chains that will bond the platelets together.

The binder material may be initially a polymer, coal tar pitch, petroleum pitch, meso-phase pitch, or organic precursor material and Step (D) further comprises thermally converting the binder material into a carbon material, typically at a temperature within the range of 350-1,200° C., but more typically in the range of 500-1,000° C. Pyrolyzation at a higher temperature may partially graphitize the resulting polymeric carbon. Partial graphitization is optional in the presently invented process.

In another preferred embodiment, the binder material comprises a conductive material selected from the group consisting of a conducting polymer, a polymeric carbon, an amorphous carbon, a petroleum pitch or its derivative, a coal tar pitch or its derivative, and combinations thereof. The conductive polymer selected from polyaniline, polypyrrole, polythiophene, a derivative thereof, or a combination thereof. The polymeric carbon may be derived from phenolic-formaldehyde, polyacrylonitrile, or cellulosic polymer.

The binder material may simply comprise a non-conductive material selected from, for instance, poly(vinylidene fluoride) (PVDF), poly(tetrafluoroethylene) (PTFE), polyvinyl fluoride (PVF), ethylene-propylene-diene copolymer (EPDM), styrene-butadiene rubber (SBR), a copolymer thereof, a derivative thereof, or a combination thereof. Its primary purpose is to bond together graphene plates to provide some mechanical integrity to the electrode.

A polymer, coal tar pitch, or petroleum pitch matrix can be further pyrolyzed or carbonized to increase the specific surface area as well as the electrical conductivity of the nanocomposite electrode. Activation of carbon binder material and/or NGPs will further increase the surface areas. The activating treatment may be selected from $CO_2$ physical activation, steam activation, KOH chemical activation, or exposure to nitric acid, fluorine, or ammonia plasma. The NGPs alone or NGP/binder composite materials may be subjected to surface treatments or surface-functionalization, such as transition metal oxide or sulfide coating, and/or conjugate chain polymer coating to obtain pseudo-capacitance effects. Surface functionalization comprises imparting to the nanocomposite a functional group selected from quinone, hydroquinone, quaternized aromatic amines, mercaptan, disulfide, sulfonate ($—SO_3$), transition metal oxide, transition metal sulfide, or a combination thereof.

Step (B) may further comprise adding to the dispersion a conductive filler selected from the group consisting of graphitic nano-fiber, carbon nano-fiber, carbon nanotube, carbon black, activated carbon, carbon fiber segment, nano-scaled metal particle, nano-scaled metal oxide, and combinations thereof.

BRIEF DESCRIPTION OF THE DRAWINGS

FIG. 6. Specific capacitance of NGP mat and Polypyrrole (PPy)-coated NGP mat-based supercapacitors.

FIG. 7. Specific capacitance of NGP-base, PAN-derived meso-porous nanocomposite-based systems.

FIG. 8. Specific surface area of NGP mat and NGP/PAN-based carbon matrix nanocomposites.

DESCRIPTION OF THE PREFERRED EMBODIMENTS

Figure 1:
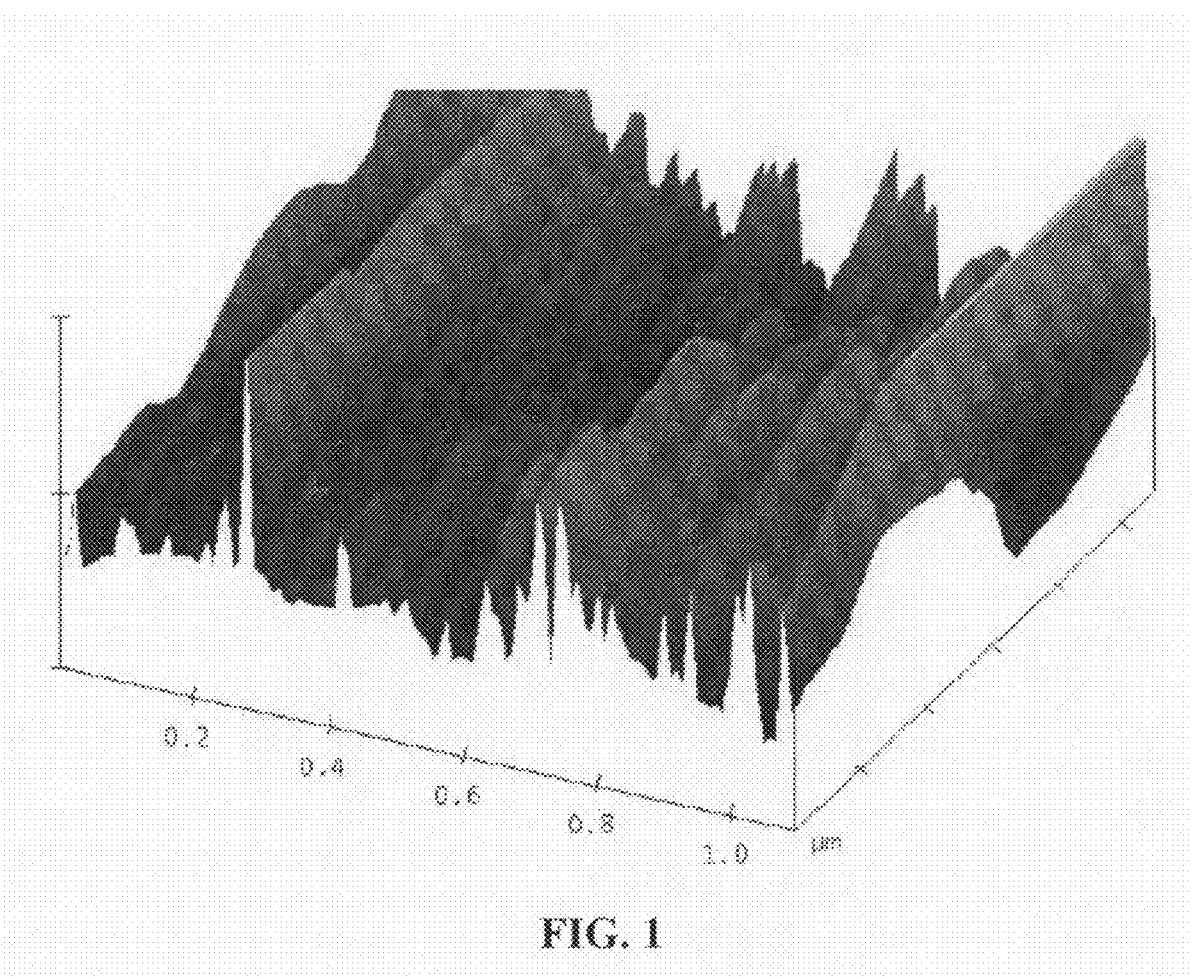
FIG. 1 An atomic force microscopic image of selected NGPs.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to limit the scope of the claimed invention.

The nano-scaled graphene platelets (NGPs) may be obtained from intercalation of graphite, exfoliation of the intercalated graphite to form a network of interconnected micro-flakes (graphite worms), and separation of these micro-flakes to obtain NGPs (e.g., following the procedures described in Ref. 13). An NGP is described as having a length (the largest dimension), a width (the second largest dimension), and a thickness. The thickness is the smallest dimension, which is no greater than 100 nm. When the platelet is approximately circular in shape, the length and width are referred to as diameter. Both the length and width of NGPs are typically in the range of 0.3 μm-20 μm. But, for the supercapacitor electrode applications, they are preferably smaller than 1 μm. The most important geometric parameter is platelet thickness. Preferably, the average thickness is less than 10 nm, more preferably less than 5 nm, and most preferably less than 2 nm. We have been able to produce NGPs with a thickness less than 1 nm.

A preferred embodiment of the present invention is a meso-porous nanocomposite material comprising fully separated NGPs that are dispersed in, bonded by, or coated with a matrix or binder material, wherein the platelets have an average thickness no greater than 100 nm (preferably smaller than 10 nm and most preferably smaller than 2 nm). Preferably, the platelets have an average length, width, or diameter no greater than 10 μm, but preferably smaller than 1 μm. When the platelets have an average thickness less than 10 nm, the resulting nanocomposite tends to have a surface area greater than 100 $m^2/gm$. When the average NGP thickness is 2 nm or smaller, the resulting nanocomposite typically has a surface area greater than 500 $m^2/gm$. With a further treatment of the binder or matrix material, such as activation or carbonization, the total surface area could easily exceed 1000 $m^2/gm$. These nano-scaled graphene plates are present in an amount no less than 15% by weight (preferably greater than 50%, most preferably greater than 75%) based on the total weight of the NGPs and a matrix, binder, or a coating material combined. This amount is preferably selected to be sufficiently high to make the nanocomposite electrically conductive with a bulk conductivity no less than 1 S/cm (when no pore exists). The amount of pores are such that the total surface area of the resulting nanocomposite is no smaller than 100 $m^2/gm$, preferably no smaller than 200 $m^2/gm$, more preferably greater than 500 $m^2/gm$, and most preferably greater than 1000 $m^2/gm$ when the composite is used as a supercapacitor electrode material.

Figure 2:
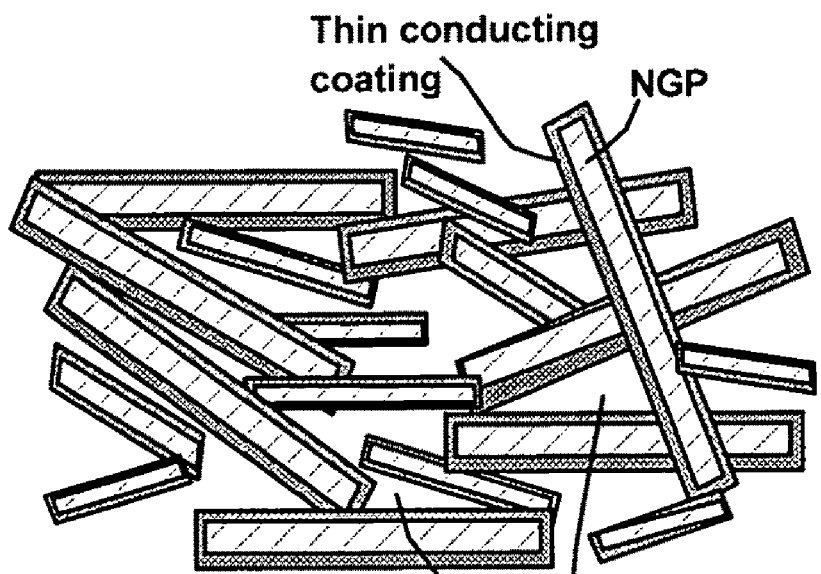
FIG. 2 Schematic of two basic forms of meso-porous NGP nanocomposites: (A) comprising NGPs coated with a thin layer of conducting polymer or surface functional groups (polymer possibly also serving as a binder material); (B) comprising NGPs bonded by a binder material that can be a non-conductive polymer, a conducting polymer, or carbon (e.g., polymeric carbon).
Figure 2:
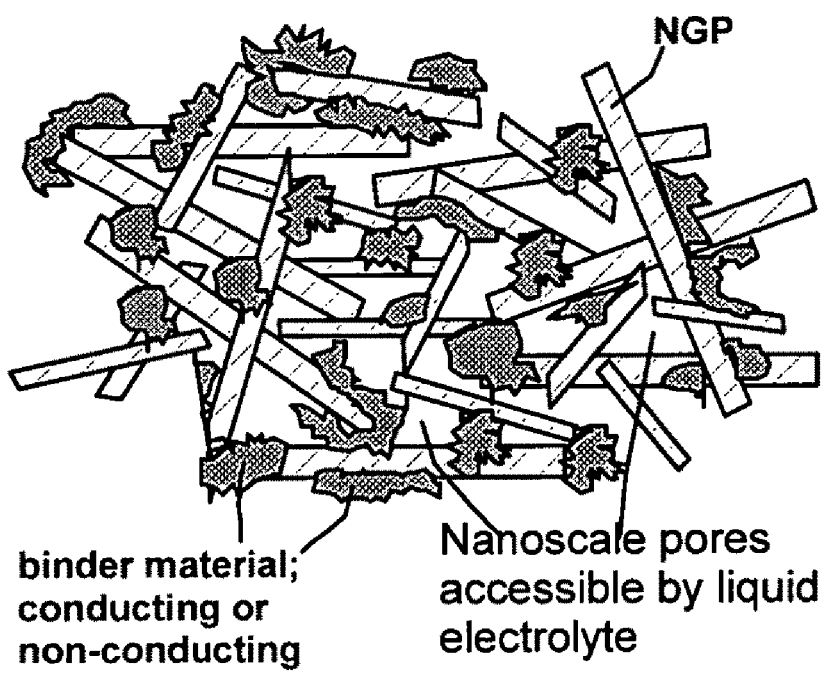

Schematically shown in FIG. 2(A) is one form of the invented meso-porous nanocomposite structure wherein NGPs are coated with an ultra-thin layer of conducting polymer, carbon, and/or surface functional groups that could promote pseudo-capacitance. The coating more or less covers the entire exposed surface of a NGP. Hence, the coating is also a binder material in this case. The NGPs are arranged in such a manner that there are a large number of minute pores which are preferably greater than 2 nm but smaller than 1 μm in size, further preferably between 2 nm and 100 nm and most preferably between 2 nm and 10 nm. If the pore size is smaller than 2 nm, the double-layer capacitance zone cannot be completely formed. If the pore sizes are too large, the surface area will be too small. The pores are preferably also interconnected to make them accessible by the liquid electrolyte when the nanocomposite is used as a supercapacitor electrode.

Another form of the invented meso-porous nanocomposite is schematically shown in FIG. 2(B), wherein NGP platelets are bonded by, coated with, or dispersed in a conducting material which is preferably a conjugate-chain conducting polymer, a carbonaceous material, an amorphous or glassy carbon, or a combination thereof. Although not a preferred choice, a non-conducting polymer such as Teflon (polytetrafluoroethylene) or poly(vinylidene fluoride) can be used as a binder to help consolidate the NGPs. Again, it is most preferred that the pores are sized between 2 nm and 10 nm. A conducting polymer provides an opportunity for added pseudo-capacitance due to the redox effect intrinsic to the conducting polymer or between the conducting polymer and the NGP. A carbon matrix can be derived from a precursor polymer, coal tar pitch, or petroleum pitch through pyrolyzation (heat-induced carbonization), which produces additional pores and surface areas.

Figure 3:
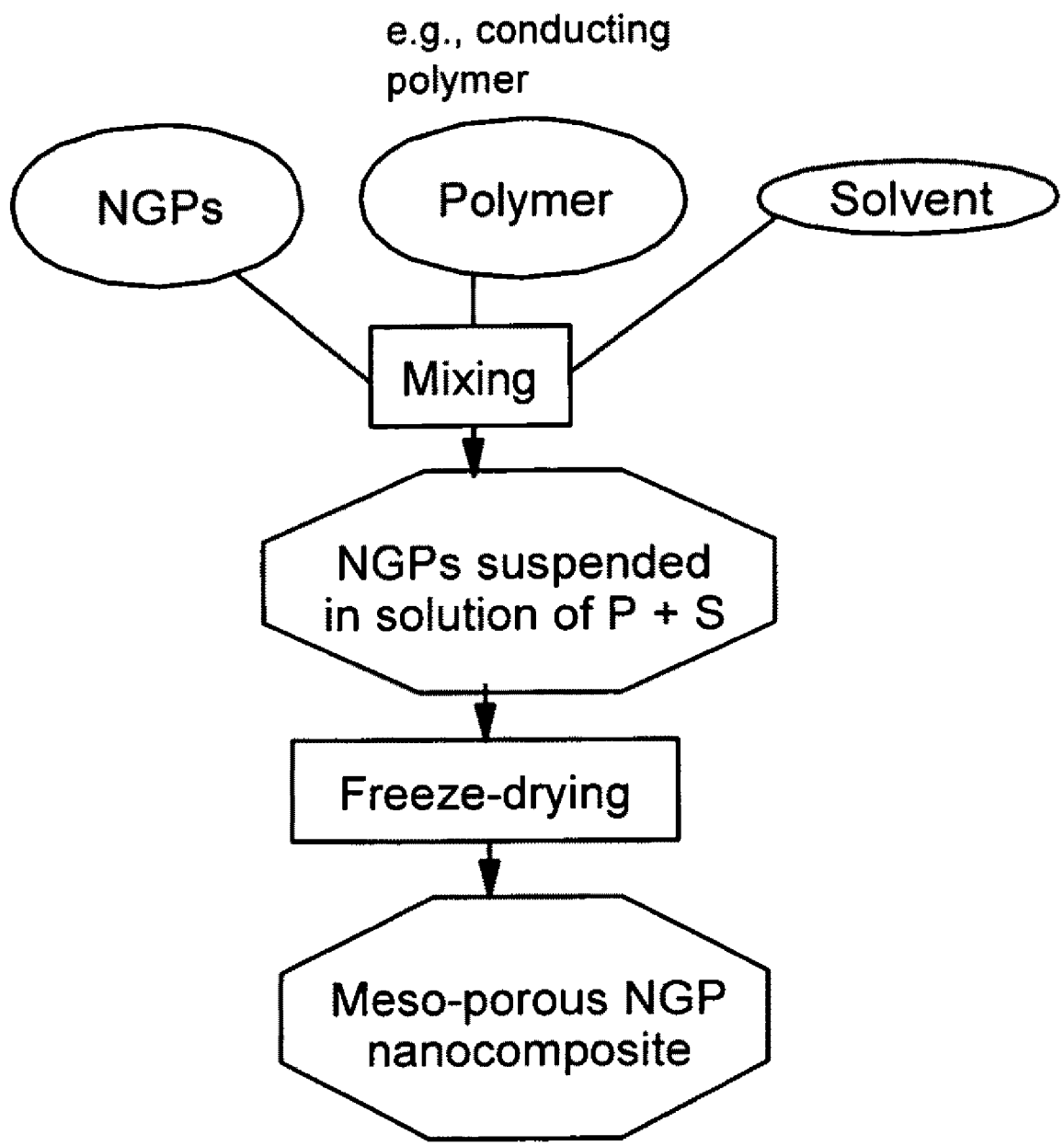
FIG. 3 One way to produce meso-porous nanocomposites.

The preparation and characteristics of meso-porous NGP nanocomposites are further described in what follows (as examples): In Route 1, as shown in FIG. 3, a meso-porous nanocomposite can be obtained by freeze-drying, which entails first dispersing NGPs in a polymer-solvent solution to form a NGP suspension. This suspension is then formed into a desired shape with the solution being rapidly frozen (e.g., using liquid nitrogen as a cooling medium). The frozen "solid" is subjected to a vacuum- or pumping-assisted procedure to facilitate sublimation of the solvent, leaving behind NGPs, the solid polymer, and a large amount of pores. If the polymer is a conducting polymer, no further chemical treatment is needed (except for conversion of a precursor polymer to a conductive polymer) and the resulting material is a good meso-porous nanocomposite that can be shaped into a supercapacitor electrode. Conducting (conjugate-chain) polymers, such as polyaniline, and their soluble precursor polymers are good choices for use in the present invention. Alternatively, a non-conducting material can be converted to become a polymeric carbon by pyrolization, which involves heating to disintegrate the polymer and removing most of the non-carbon elements from the material. The non-carbon elements, forming molecules like carbon dioxide, escape from the polymer, creating minute pores.

Figure 4:
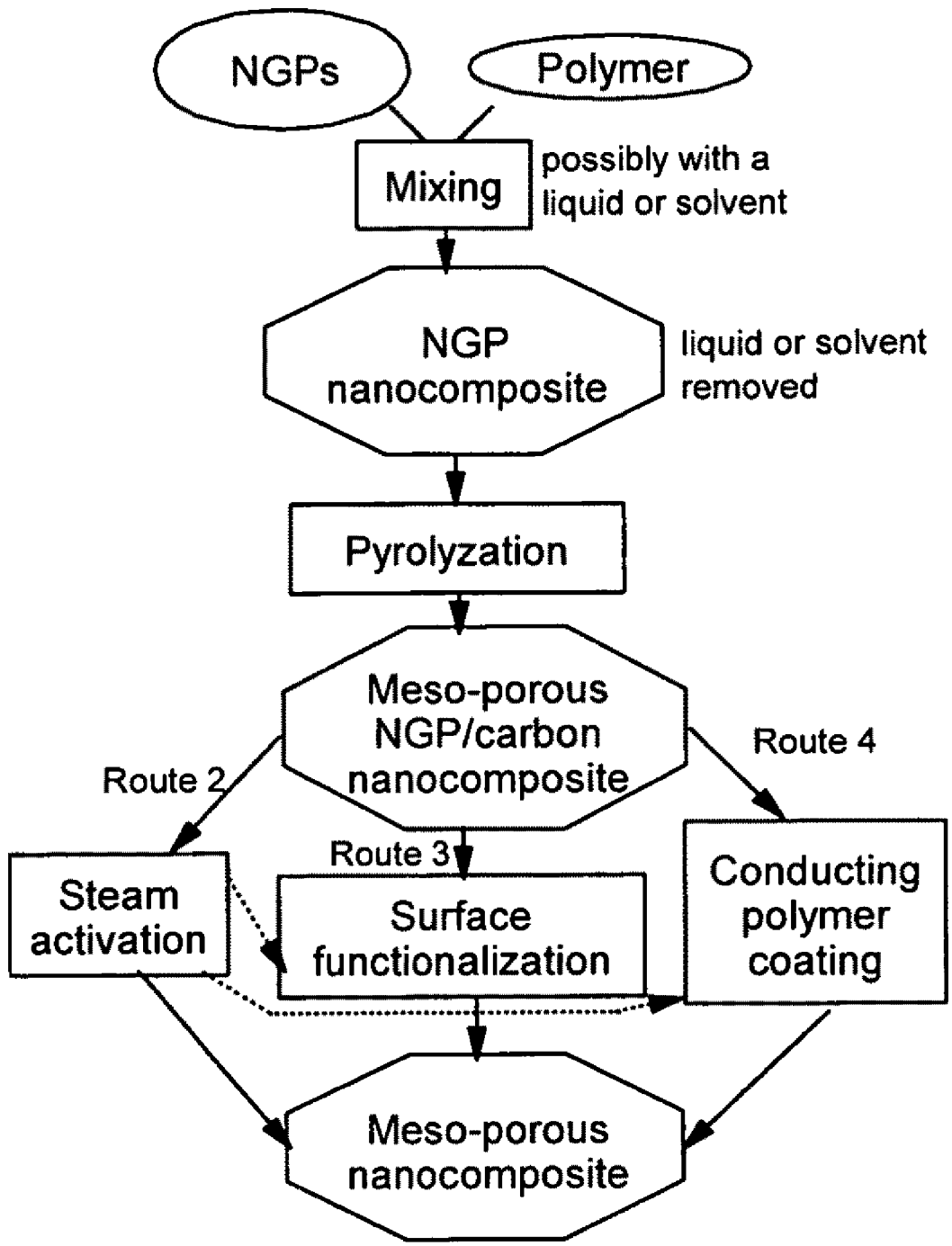
FIG. 4 Additional three routes to the fabrication of meso-porous nanocomposites.

Alternatively, in Routes 2-4 as shown in FIG. 4, a polymer and NGPs can be mixed through solution mixing or melt blending to form a NGP nanocomposite. The polymer is preferably one that has a high carbon yield such as phenolic resin and polyacrylonitrile (PAN). The polymer nanocomposite is then pyrolyzed to become carbon nanocomposite. The removal of non-carbon elements from the polymer generates a large number of pores that are by and large interconnected to allow for accessability of liquid electrolyte. This pyrolization procedure could significantly increase the specific surface area from typically 100-200 $m^2/gm$ to above 300 $m^2/gm$ (typically 500-1,500 $m^2/gm$), a highly desirable result. The meso-porous carbon nanocomposite may be subjected to an activation treatment (analogous to activation of carbon black materials) to create additional surfaces and possibly imparting functional chemical groups to these surfaces. The activation treatment can be accomplished through, for instance, $CO_2$ physical activation, steam activation, KOH chemical activation, or exposure to nitric acid, fluorine, or ammonia plasma.

Further alternatively, the meso-porous carbon nanocomposite (with or without an activation treatment) may be surface functionalized or coated with a conducting polymer in Route 3 and Route 4, respectively. Conducting polymers, such as polyacetylene, polypyrrole, polyaniline, polythiophene, and their derivatives, are good choices for use in the present invention. These treatments are intended for further increasing the capacitance value through pseudo-capacitance effects such as redox reactions. Alternatively, transition metal oxides or sulfides such as $RuO_2$, $TiO_2$, $MnO_2$, $Cr_2O_3$, and $CO_2O_3$ can be deposited onto the NGP surface for pseudo-capacitance. Other useful surface functional groups may include quinone, hydroquinone, quaternized aromatic amines, mercaptans, or disulfides. This latter class of functional groups also have been shown to impart pseudo-capacitance to CNT-based supercapacitors.

In another preferred embodiment, polymer-coated NGPs can be prepared by dispersing NGPs in a dilute polymer-solvent solution. By stir-mixing these platelets in the solution, separating these platelets from the solution via filtering, and then removing the solvent (in a vacuum oven or chemical fume hood) one obtains NGP platelets which are each surface-coated with a thin layer of polymer. A structure containing polymer-coated NGPs can then go through the procedures described in FIG. 4 (Routes 2-4) to produce meso-porous nanocomposites.

In another preferred embodiment of the present invention, a porous composite can be made to an appropriate shape by a conventional slurry molding technique using NGPs, possibly along with a small amount of carbon nano-fibers (CNFs), carbon nanotubes (CNTs) or other nano-scaled fillers, if so desired. An aqueous slurry is prepared which comprises a mixture of NGPs with an intended matrix or binder polymer, and possibly along with other conductive ingredients such as carbon fibers, metal fibers, CNTs, CNFs, carbon blacks, activated carbon particles, metal particles, or a combination thereof. The matrix polymer may be a thermoplastic in a powder, granule, or, preferably, fibrous or filamentous form. The slurry, consisting of NGPs, other optional fillers, polymer particles/fiber segments, and water, is forced through a sieve or mold screen of a desired mesh size to trap the solids (allowing water to go through), thus producing a wet monolithic, which is subsequently dried at a temperature of less than 80° C. This mold screen may be a part of a mold. The initial porosity of the preform in the slurry molded and dried condition is typically in the range 30-70%. If necessary, the dried monolith preform is further densified via compression. The resulting solid mixture may be transferred to a hot pressing mold cavity for compression molding into a useful shape, such as a supercapacitor electrode. During the molding procedure, the thermoplastic fibers or powders get melted and the resulting polymer fluid flows around the reinforcement elements (i.e., NGPs) to become the binder or matrix of a composite, which is then pyrolyzed to become a meso-porous nanocomposite.

In another preferred embodiment, the porous structure can be made by using a platelet/resin spraying technique. The directed platelet spray-up process utilizes an air-assisted gun which conveys reinforcement elements (NGPs) and a resin to a molding tool (e.g., a perforated metal screen shaped identical or similar to the part to be molded). In addition to NGPs, other conductive ingredient such as metal fibers, carbon nano-tubes, graphitic nano-fibers, carbon fibers, carbon blacks, activated carbon particles, or a combination thereof can be a part of the air-driven stream of preform ingredients that impinges upon the metal screen. This shaped screen can be a part of a mold. The NGPs may be held in place on the screen by a large blower drawing air through the screen. Once the desired thickness of reinforcement has been achieved, the spraying system is turned off and the preform is ready for subsequent molding operations, which could entail polymerizing or curing the resin (if thermosetting) or heating and cooling the resin (if thermoplastic). The composite structure may be subsequently pyrolyzed to obtain a meso-porous nanocomposite.

Figure 5:
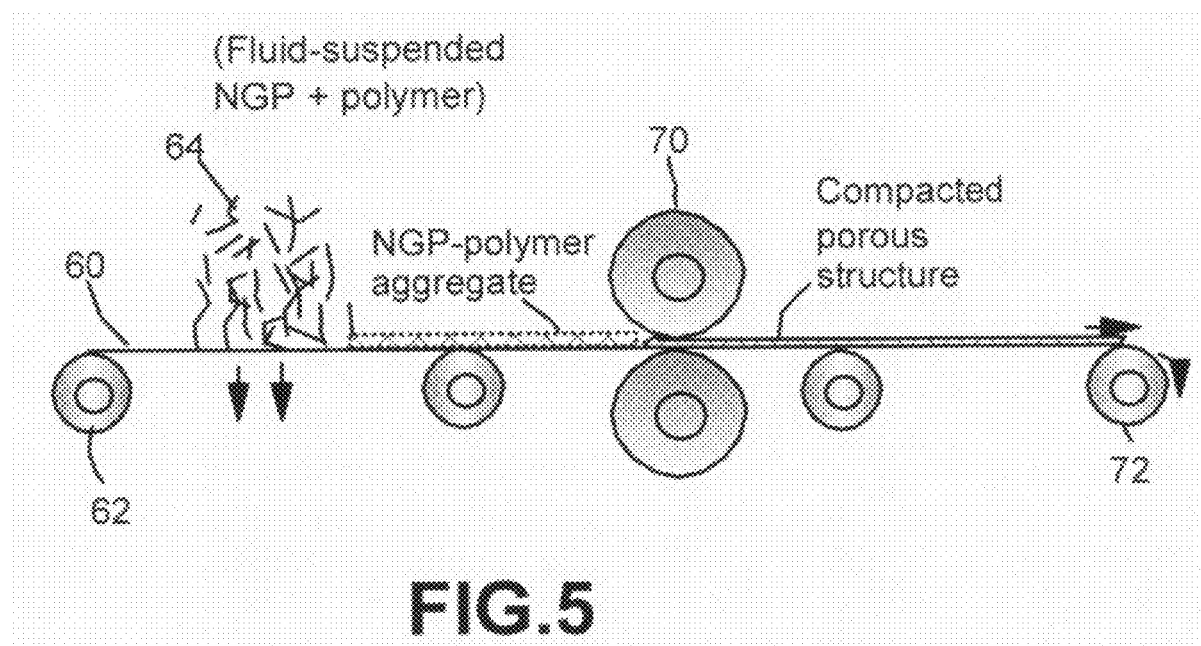
FIG. 5 Schematic of a slurry molding- or directed platelet/resin spray-based process for producing an intimate blend of NGPs and a polymer to form meso-porous nanocomposite electrode. This is a fast, continuous roll-to-roll process for the mass production of supercapacitor electrodes. Two layers of such an electrode material may be arranged to sandwich a separator layer (with electrolyte dispersed therein) to form a basic three-layer super capacitor structure, which may be further sandwiched between two current collector layers (e.g., aluminum or copper sheets) to form a supercapacitor on a continuous basis.

Both the slurry molding and directed spraying routes can be implemented as a continuous process. For instance, as shown in FIG. 5, the process begins with pulling a web 60 (porous substrate sheet) from a roller 62. The moving web receives a stream of slurry 64 (as described in the aforementioned slurry molding route) from above the web. Water sieves through the web with all other ingredients (a mixture of NGPs and thermoset powders or thermoplastic fibers, etc.) remaining on the surface of the web. These solid ingredients are moved forward to go through a compaction stage by a pair of compaction rollers 70. Heat and/or radiation (e.g., UV light) may be supplied to the mixture before, during, and/or after compaction to begin to cure the thermoset resin or begin to melt the thermoplastic. This mixture or preform (essentially an electrode) may be combined with a separator layer and another similarly made electrode to form a basic supercapacitor structure on a continuous basis. This three-layer structure may be sandwiched between two current collector layers (e.g., aluminum foil) to form a supercapacitor.

Alternatively, the mixture or preform can be taken up on a winding drum 72 (FIG. 5) for later use (e.g., shaping and pyrolyzation treatments). For instance, NGP/phenolic resin can be subjected to pyrolyzation treatments to convert phenolic resin to a carbon matrix, resulting in a meso-porous NGP carbon/carbon nanocomposite. Carbonization of a polymer, either thermoplastic or thermoset, can be conducted in an inert atmosphere at a temperature in the range of 300-500° C. first, which is then followed by a higher temperature treatment at 500-2,500° C. The resulting structure is highly porous.

Similar procedures may be followed for the case where the mixture of NGPs and polymer powders or fibers is delivered to the surface of a moving web 60 (FIG. 5) by compressed air, like in a directed platelet/resin spraying route described above. Air will permeate through the web with other solid ingredients trapped on the surface of the web, which are conveyed forward. The subsequent operations are similar to those involved in the continuous slurry molding route.

Both the slurry molding and directed spraying techniques can be used to form a mat or web of NGPs, which may be optionally bonded by a binder. The resulting mat can be used as an electrode (typically an anode) on to which a conducting polymer is electro-polymerized.

As indicated earlier, additional fillers (preferably nano-scaled) may be added to the NGP composites to modify other properties such as friction, wear, strength, stiffness, and toughness. These nano-scaled fillers may be selected from the group consisting of carbon nanotubes, carbon nano fibers, carbon blacks, nano-powders, and combinations thereof.

The above discussion leads to another preferred embodiment of the present invention, which is a process for continuously producing a supercapacitor electrode. The process comprises: (A) Continuously providing a dispersion comprising a binder material initially in a liquid form and nano-scaled graphene platelets, wherein each of the platelets comprises a single graphene sheet or a stack of multiple graphene sheets, and the platelets have an average thickness no greater than 100 nm; (B) Continuously forming the dispersion into a desired shape (e.g., a thin layer on the surface of a moving substrate); and (C) Continuously treating the binder material under a desired temperature or radiation environment to produce a meso-porous nanocomposite electrode, wherein the platelets are bonded by the binder material and the electrode has electrolyte-accessible pores characterized in that the nanocomposite has a surface area greater than about 100 $m^2/gm$.

The binder may comprise a thermosetting resin or a polymerizable monomer and step (D) comprises curing the resin or polymerizing the monomer to form a solid resin or polymer with the assistance of heat, radiation (e.g., ultra violet and electron beam), an initiator, a catalyst, or a combination thereof. The binder material may comprise a conductive material selected from the group consisting of a conducting polymer, a polymeric carbon, an amorphous carbon, a petroleum pitch or its derivative, a coal tar pitch or its derivative, and combinations thereof. Alternatively, the binder material may comprise a non-conductive material selected from poly(vinylidene fluoride), poly(tetrafluoroethylene), polyvinyl fluoride, ethylene-propylene-diene copolymer, styrene-butadiene rubber, a copolymer thereof, a derivative thereof, or a combination thereof.

The dispersion in step (A) may further comprise a conductive filler selected from the group consisting of graphitic nano-fiber, carbon nano-fiber, carbon nanotube, carbon black, activated carbon, carbon fiber segment, nano-scaled metal particle, nano-scaled metal oxide, and combinations thereof. The graphene platelets may be surface-functionalized before or after the formation of the dispersion.

It is also possible that the starting binder material is in a liquid form already and, hence, it is not necessary to have another liquid medium in order to form a dispersion or suspension. Hence, another preferred embodiment of the present invention is a process for continuously producing a supercapacitor electrode. The process comprises: (A) Continuously providing a dispersion comprising a binder material initially in a liquid form and nano-scaled graphene platelets, wherein each of the platelets comprises a single graphene sheet or a stack of multiple graphene sheets, and the platelets have an average thickness no greater than 100 nm (preferably smaller than 10 nm, and most preferably smaller than 2 nm); (B) Continuously forming the dispersion into a desired shape; and (C) Continuously treating the binder material under a desired temperature or radiation environment to produce a meso-porous nanocomposite electrode, wherein the platelets are bonded by the binder material and the electrode has electrolyte-accessible pores characterized in that the nanocomposite has a surface area greater than about 1100 $m^2/gm$.

The following examples serve to illustrate the preferred embodiments of the present invention and should not be construed as limiting the scope of the invention:

Example 1

Poly(3-Methyl-Thiophene)-Coated NGPs

Electronically conductive polymers by themselves are promising supercapacitor electrode materials because the charge process involves the entire polymer mass and they provide low equivalent series resistance for the electrode. When combined with an NGP-type substrate material, the conducting polymer can impart pseudo-capacitance to the electrode. One desirable conductive polymer selected was poly(3-methyl-thiophene) (pMeT), particularly its p-doped variant. Poly(3-methyl-thiophene) could be synthesized by oxidative chemical polymerization technique using ferric chloride as a dopant in an inert atmosphere. However, we chose to prepare PMeT doped with different anions electrochemically in the presence of tetra-alkyl-ammonium salts using an NGP mat as an electrode. The specific capacitance of an NGP mat (average NGP thickness=5.2 nm, length=490 nm, and width=490 nm) with no further treatment was found to be 38 F/g, which was increased to 93 F/g with a thin coating of pMeT. (It may be noted that these specific capacitance values were obtained from non-optimized samples.) This was achieved with low-cost NGPs, as opposed to expensive CNT-based materials. A multi-wall CNT/poly(3,4-ethylenedioxythiophene) composite, prepared by chemical or electrochemical polymerization, when evaluated in 1 M $H_2SO_4$, 6 M KOH, or 1 M tetra-ethylammonium tetrafluoroborate (TEABF4) in acetonitrile, exhibited capacitance values of 60 to 160 F/g. However, CNT materials are much more expensive.

Example 2

Polypyrrole-Coated NGPs

Polypyrrole (PPy) can be prepared by electrochemical polymerization with well-controlled growth rates and film thickness. When a monomer solution was electrolyzed in the presence of $Et_4N^+BF_4^-$, a blue-black conducting polymer was produced at the anode. This electrode was made of a NGP-based mat using a slurry molding process shown in FIG. 5 without a binder polymer. The produced PPy was in the doped state. Several NGP groups with thickness ranging from approximately 1.9 nm to approximately 82 nm were prepared for the present study. As indicated in FIG. 6, the specific capacitance of the NGP mat electrode without any further surface treatment was in the range from 5.2 F/g (for the mat with average NGP thickness of about 82 nm) to 82 F/g (for NGP thickness of approximately 1.9 nm). With a PPy coating, the corresponding values were in the range of 41 F/g-143 F/g, indicating a significant pseudo-capacitance effect.

Example 3

NGP-Carbon Black with a Teflon Binder

Carbon black (Black Pearls 2000 from Cabot) and NGPs (at a ratio of 5:5, 8:2, and 10:0 (pure carbon black)) were mixed and dispersed in deionized water. A Teflon particle suspension was poured into the carbon black-NGP-deionized water slurry and thoroughly stirred. The resulting sludge was dried to a dough and rolled into a Nickel net to form an electrode of 0.2 mm thickness, which was sintered at 320° C. under a pressure of 4 $kg/cm^2$. The electrolyte used was 1 M tetra-ethyl-ammonium tetrafluoroborate ($TEABF_4$) in acetonitrile. The specific capacitance of these three samples falls into the range of 70-80 F/g. However, the sample with the CB/NGP ratio of 5:5 exhibits an electrical conductivity greater than 100 S/cm while the pure CB sample (10:0 ratio) has a conductivity lower than 0.1 S/cm. This implies that the NGP can dramatically reduce the equivalent series resistance of a carbon black or activated carbon-based supercapacitor electrode material. This is an important feature for a good electrode material since a lower resistance could lead to a lower energy loss and faster capacitor response. The maximum power density of a supercapacitor is given by $P_{max}=V_i^2/$ (4R), where $V_i$ is the initial voltage and R the equivalent series resistance (ESR). A lower ESR means a higher power density. Due to their high length-to-thickness and width-to-thickness ratios, NGPs could easily overlap each other to form a continuous electron path for enhanced conductivity. Other fillers that can be incorporated in the nanocomposite includes graphitic nano-fiber, carbon nanotube, carbon fiber, nano-scaled metal, nano-scaled metal oxide, and combinations thereof.

Example 4

NGP-Carbon Matrix Composite Film and NGP-Based Bucky Paper

The performance of supercapacitor electrodes based on NGP-carbon nanocomposite film derived from polyacrylonitrile (PAN) matrix was investigated. A NGP/PAN dispersion was prepared at room temperature by mixing NGPs with a 1.5 g/l dimethylformamide (DMF) solution of poly(acrylonitrile-methyl acrylate) (90:10) (PAN copolymer with Mw=approximately 100,000 g/mol from Aldrich). The weight ratio of NGP to PAN copolymer was 4:6. Solvent casting of the suspension at 85-100° C. resulted in a thin film of 5-6 μm thickness. The film was essentially a Bucky paper. Samples of the film were heat treated at 700° C. in an argon atmosphere for 30 minutes to obtain NGP-carbon matrix nanocomposites (Sample Group 4-A). Several of these samples were subsequently activated in $CO_2$ at 700° C. for 20 minutes in a tube furnace to obtain Sample Group 4-B. Some of Group 4-A material was electro-chemically deposited with a thin layer of PPy to obtain Sample Group 4-C. The data shown in FIG. 7 demonstrate that both surface activation and conductive polymer coating are very effective in further enhancing the specific capacitance of NGP Bucky paper or web. Impressive supercapacitance values (e.g., >200 F/g) are readily achievable with the presently invented meso-porous nanocomposites.

FIG. 8 shows that the specific surface area of an NGP mat or web can be significantly increased by adding a polymer binder or matrix polymer and then carbonizing this polymer (e.g., an increase from 501 $m^2/g$ to 1130 $m^2/g$ in one sample and from 189 $m^2/g$ to 890 $m^2/g$ in another sample). The polymer can be any polymer with a high carbon content such as phenolic-formaldehyde, polyacrylonitrile, and cellulosic polymers.

Example 5

Transition Metal Oxide-Coated NGP Mat

A number of transition metal halides bearing a 2,6-bis(imino)pyridyl ligand, $LMCl_2$, where L=2,6-$(ArNCCH_3)_2$ $C_5H_3N$ and M=transition metal atom), have been synthesized (prior art). The manganese halide complex (M=Mn) was electrochemically deposited onto the surface of an NGP mat electrode in a water-containing acetonitrile electrolyte (containing 0.1 M of tetra-butyl-ammonium perchlorate) to form a thin manganese oxide layer. The specific capacitance of the NGP mat (NGP thickness=5.2 nm) was increased from 38 F/g to 79 F/g. Other transition metal oxides or sulfides can also be used as a source of pseudocapacitance.

In conclusion, we have successfully developed processes for producing a new and novel class of meso-porous nanocomposites that are superior supercapacitor electrode materials. A supercapacitor can make use of this material in one or both of the electrodes. These NGP-based nanocomposites exhibit great capacitance and electrical conductivity. Other desirable features of NGPs include chemical stability and low mass density. They are also of lower costs compared with carbon nano-tube based materials. Both NGPs and NGP-based nanocomposites can be mass-produced cost-effectively.

We claim:

1. A process for producing meso-porous nanocomposite supercapacitor electrode comprising nano-scaled graphene platelets, said process comprising:
    (A) Providing nano-scaled graphene platelets, wherein each of the platelets comprises a single graphene sheet or a stack of multiple graphene sheets, and the platelets have an average thickness no greater than 100 nm;
    (B) Combining a binder material, said graphene platelets, and a liquid to form a dispersion;
    (C) Forming said dispersion into a desired shape and removing said liquid to produce a binder-platelet mixture; and
    (D) Treating said binder material under a desired temperature or radiation environment to convert said binder-platelet mixture into said meso-porous nanocomposite electrode, wherein said platelets are bonded by said binder and said electrode has electrolyte-accessible pores characterized in that said nanocomposite has a surface area greater than about 100 $m^2/gm$.

2. The process as defined in claim 1 wherein said platelets have an average thickness less than 5 nm or said nanocomposite has a surface area greater than about 200 $m^2/gm$.

3. The process as defined in claim 1 wherein said platelets have an average thickness less than 2 nm or said nanocomposite has a surface area greater than about 500 $m^2/gm$.

4. The process as defined in claim 1 wherein said binder material is a polymer and said liquid is a solvent for said polymer; step (B) comprises dissolving at least a part of said polymer in said solvent to form a solution; and step (C) comprises vaporizing said solvent.

5. The process as defined in claim 4 wherein said step (B) and step (C) comprise freeze-drying said liquid to produce pores.

6. The process as defined in claim 1 wherein said binder material is initially in a fine powder or filament form and said step (D) comprises melting said powder or filament to form a flowable melt, allowing said binder melt to attach to said platelets, and solidifying said binder to produce said nanocomposite electrode containing platelets bonded by a solid binder material.

7. The process as defined in claim 1 wherein said binder comprises a thermosetting resin or a polymerizable monomer and said step (D) comprises curing said resin or polymerizing said monomer to form a solid resin or polymer with the assistance of heat, radiation, an initiator, a catalyst, or a combination thereof.

8. The process as defined in claim 1 wherein said binder material is initially a polymer, coal tar pitch, petroleum pitch, meso-phase pitch, or organic precursor material and said step (D) further comprises thermally converting said binder material into a carbon material.

9. The process as defined in claim 7, further comprising a step of pyrolyzing said resin or polymer to obtain a polymeric carbon.

10. The process as defined in claim 1 wherein said binder material comprises a conductive material selected from the group consisting of a conducting polymer, a polymeric carbon, an amorphous carbon, a petroleum pitch or its derivative, a coal tar pitch or its derivative, and combinations thereof.

11. The process as defined in claim 1 wherein said binder material comprises a conductive polymer selected from polyaniline, polypyrrole, polythiophene, a derivative thereof, or a combination thereof.

12. The process as defined in claim 1 wherein said binder material comprises a non-conductive material selected from poly(vinylidene fluoride), poly(tetrafluoroethylene), polyvinyl fluoride, ethylene-propylene-diene copolymer, styrene-butadiene rubber, a copolymer thereof, a derivative thereof, or a combination thereof.

13. The process as defined in claim 1 wherein said binder material comprises a carbon material and step (D) further comprises a step of activating said carbon material and said platelets.

14. The process as defined in claim 1 wherein said binder material comprises a carbon material that is subjected to an activating treatment selected from $CO_2$ physical activation, steam activation, KOH chemical activation, NaOH chemical treatment, or exposure to nitric acid, fluorine, ammonia plasma, oxygen plasma, or a combination thereof.

15. The process as defined in claim 1 wherein said binder material comprises a carbon material and step (D) further comprises a step of surface-functionalizing said carbon material and graphene platelets.

16. The process as defined in claim 1 further comprising a step of surface-functionalizing said nanocomposite.

17. The process as defined in claim 16 wherein said step of surface functionalization comprises imparting to said nanocomposite a functional group selected from quinone, hydroquinone, quaternized aromatic amines, mercaptan, disulfide, sulfonate ($—SO_3$), transition metal oxide, transition metal sulfide, or a combination thereof.

18. The process as defined in claim 1 wherein said binder material comprises a polymeric carbon derived from phenolic-formaldehyde, polyacrylonitrile, or cellulosic polymer.

19. The process as defined in claim 1, wherein step (B) further comprises adding to the dispersion a conductive filler selected from the group consisting of graphitic nano-fiber, carbon nano-fiber, carbon nanotube, carbon black, activated carbon, carbon fiber segment, nano-scaled metal particle, nano-scaled metal oxide, and combinations thereof.

20. A process for producing meso-porous nanocomposite supercapacitor electrode comprising nano-scaled graphene platelets, said process comprising:
(A) Providing nano-scaled graphene platelets, wherein each of the platelets comprises a single graphene sheet or a stack of multiple graphene sheets, and the platelets have an average thickness no greater than 100 nm;
(B) Combining a binder material in a liquid form and said graphene platelets to form a dispersion;
(C) Forming said dispersion into a desired shape; and
(D) Treating said binder material under a desired temperature or radiation environment to produce said meso-porous nanocomposite electrode, wherein said platelets are bonded by said binder and said electrode has electrolyte-accessible pores characterized in that said nanocomposite has a surface area greater than about 100 $m^2$/gm.

21. The process as defined in claim 20 wherein said binder comprises a thermosetting resin or a polymerizable monomer and said step (D) comprises curing said resin or polymerizing said monomer to form a solid resin or polymer with the assistance of heat, radiation, an initiator, a catalyst, or a combination thereof.

22. The process as defined in claim 20 wherein said binder material is initially a polymer, coal tar pitch, petroleum pitch, meso-phase pitch, or organic precursor material and said step (D) further comprises thermally converting said binder material into a carbon material.

23. The process as defined in claim 20 wherein said binder material comprises a conductive material selected from the group consisting of a conducting polymer, a polymeric carbon, an amorphous carbon, a petroleum pitch or its derivative, a coal tar pitch or its derivative, and combinations thereof.

24. The process as defined in claim 20 wherein said binder material comprises a non-conductive material selected from poly(vinylidene fluoride), poly(tetrafluoroethylene), polyvinyl fluoride, ethylene-propylene-diene copolymer, styrene-butadiene rubber, a copolymer thereof, a derivative thereof, or a combination thereof.

25. The process as defined in claim 22, further comprising a step of activating said carbon material and said platelets.

26. The process as defined in claim 22, further comprising a step of surface-functionalizing said carbon material and graphene platelets.

27. The process as defined in claim 20, further comprising a step of surface-functionalizing said nanocomposite.

28. The process as defined in claim 27 wherein said step of surface functionalization comprises imparting to said nanocomposite a functional group selected from quinone, hydroquinone, quaternized aromatic amines, mercaptan, disulfide, sulfonate ($—SO_3$), transition metal oxide, transition metal sulfide, or a combination thereof.

29. A process of continuously producing a supercapacitor electrode, said process comprising:
(A) Continuously providing a dispersion comprising a binder material, a liquid medium, and nano-scaled graphene platelets, wherein each of the platelets comprises a single graphene sheet or a stack of multiple graphene sheets, and the platelets have an average thickness no greater than 100 nm;
(B) Continuously forming said dispersion into a desired shape and removing said liquid to produce a binder-platelet mixture; and
(C) Continuously treating said binder material under a desired temperature or radiation environment to convert said binder-platelet mixture into said meso-porous nanocomposite electrode, wherein said platelets are bonded by said binder and said electrode has electrolyte-accessible pores characterized in that said nanocomposite has a surface area greater than about 100 $m^2$/gm.

30. The process as defined in claim 29 wherein said binder comprises a thermosetting resin or a polymerizable monomer and said step (D) comprises curing said resin or polymerizing said monomer to form a solid resin or polymer with the assistance of heat, radiation, an initiator, a catalyst, or a combination thereof.

31. The process as defined in claim 29 wherein said binder material comprises a conductive material selected from the group consisting of a conducting polymer, a polymeric carbon, an amorphous carbon, a petroleum pitch or its derivative, a coal tar pitch or its derivative, and combinations thereof.

32. The process as defined in claim 29 wherein said binder material comprises a non-conductive material selected from poly(vinylidene fluoride), poly(tetrafluoroethylene), polyvinyl fluoride, ethylene-propylene-diene copolymer, styrene-butadiene rubber, a copolymer thereof, a derivative thereof, or a combination thereof.

33. The process as defined in claim 29, wherein said dispersion further comprises a conductive filler selected from the group consisting of graphitic nano-fiber, carbon nano-fiber, carbon nanotube, carbon black, activated carbon, carbon fiber segment, nano-scaled metal particle, nano-scaled metal oxide, and combinations thereof.

34. The process as defined in claim 29, wherein said graphene platelets are surface-functionalized.

35. A process of continuously producing a supercapacitor electrode, said process comprising:
(A) Continuously providing a dispersion comprising a binder material initially in a liquid form and nano-scaled graphene platelets suspended in said binder liquid, wherein each of the platelets comprises a single graphene sheet or a stack of multiple graphene sheets, and the platelets have an average thickness no greater than 100 nm;
(B) Continuously forming said dispersion into a desired shape; and
(C) Continuously treating said binder material under a desired temperature or radiation environment to produce said meso-porous nanocomposite electrode, wherein said platelets are bonded by said binder and said electrode has electrolyte-accessible pores characterized in that said nanocomposite has a surface area greater than about 100 $m^2$/gm.

36. The process as defined in claim 35 wherein said binder comprises a thermosetting resin or a polymerizable monomer and said step (D) comprises curing said resin or polymerizing said monomer to form a solid resin or polymer with the assistance of heat, radiation, an initiator, a catalyst, or a combination thereof.

37. The process as defined in claim 35 wherein said binder material comprises a conductive material selected from the group consisting of a conducting polymer, a polymeric carbon, an amorphous carbon, a petroleum pitch or its derivative, a coal tar pitch or its derivative, and combinations thereof.

38. The process as defined in claim 35 wherein said binder material comprises a non-conductive material selected from poly(vinylidene fluoride), poly(tetrafluoroethylene), polyvinyl fluoride, ethylene-propylene-diene copolymer, styrene-butadiene rubber, a copolymer thereof, a derivative thereof, or a combination thereof.

39. The process as defined in claim 35, wherein said dispersion further comprises a conductive filler selected from the group consisting of graphitic nano-fiber, carbon nano-fiber, carbon nanotube, carbon black, activated carbon, carbon fiber segment, nano-scaled metal particle, nano-scaled metal oxide, and combinations thereof.

40. The process as defined in claim 35, wherein said graphene platelets are surface-functionalized.

* * * * *